United States Patent [19]

Odagawa et al.

[11] Patent Number: 4,803,426

[45] Date of Patent: Feb. 7, 1989

[54] MAGNETIC TILT SENSOR

[75] Inventors: Yoshimoto Odagawa; Yasushi Yanagisawa; Hiraku Imaizumi, all of Chiba, Japan

[73] Assignee: TDK Corporation, Tokyo, Japan

[21] Appl. No.: 74,249

[22] Filed: Jul. 16, 1987

[30] Foreign Application Priority Data

Jul. 21, 1986 [JP] Japan .................... 61-169930

[51] Int. Cl.⁴ .................................... G01B 7/14
[52] U.S. Cl. .................................... 324/207; 33/364; 324/262
[58] Field of Search ............... 324/207, 208, 226, 228, 324/234, 235, 236, 239, 243, 244, 259, 260, 261, 262, 345, 346; 33/364

[56] References Cited

U.S. PATENT DOCUMENTS

| 4,282,484 | 8/1981 | Morrow | 324/226 X |
| 4,371,836 | 2/1983 | Nickel et al. | 324/207 |
| 4,517,514 | 5/1985 | Howell | 324/207 |
| 4,661,773 | 4/1987 | Kawakita et al. | 324/208 |
| 4,694,247 | 9/1987 | Meili et al. | 324/262 X |

Primary Examiner—Reinhard J. Eisenzopf
Assistant Examiner—Warren S. Edmonds
Attorney, Agent, or Firm—Burgess, Ryan & Wayne

[57] ABSTRACT

A magnetic tilt sensor in which a permanent magnet having a surface coated with a magnetic fluid is housed in a space inside a nonmagnetic case and is freely movable, and a magnetic sensing element is disposed to oppose the space through the case. When the case is tilted, the permanent magnet inside the space is moved to a lower position, and hence magnetism detected by the magnetic sensing element changes, thereby detecting a tilt of the case.

4 Claims, 1 Drawing Sheet

MAGNETIC TILT SENSOR

BACKGROUND OF THE INVENTION

I. Field of the Invention

The present invention relates to a tilt sensor for detecting a tilt of an object when the object is tilted.

II. Description of the Prior Art

Conventional tilt measuring devices of this type vary from simple devices such as a level and a device used in an oilstove to visually show horizontality by suspending a counterweight through a chain to a sophisticated one such as a gyroscopic horizon.

Although a simple device such as a level is inexpensive, a tilt can be checked by only a visual observation. Therefore, it is not designed to be used in a control system for resetting a tilted object to a horizontal position. Use of a sophisticated device such as a gyroscopic horizon is limited to an expensive machine such as an aircraft.

SUMMARY OF THE INVENTION

It is a principal object of the present invention to provide a tilt sensor having a simple structure, capable of detecting a tilt with high precision, and applicable to a control system such as attitude control.

In order to achieve the above object, a tilt sensor according to the present invention comprises a nonmagnetic case having a space therein, a permanent magnet a surface of which is coated with a magnetic fluid, the permanent magnet being housed to be freely movable in the space, and a magnetic sensing element disposed and fixed to oppose the space through the case and detect magnetism of the permanent magnet.

According to the above arrangement, when the case is tilted, the permanent magnet disposed therein is moved to the lowest position by its weight. Accordingly, magnetism detected by the magnetic sensing element changes, thereby detecting that the case is tilted.

The above and other objects, features, and advantages of the present invention will be apparent from the following detailed description of an embodiment in conjunction with the accompanying drawings.

DETAILED DESCRIPTION OF THE PREFERRED EMBODIMENT

Figure 1:
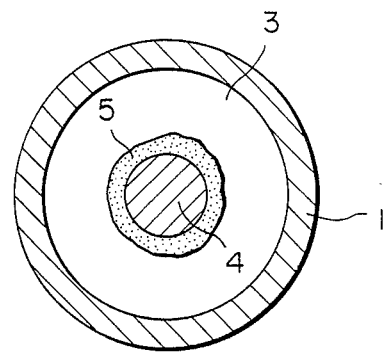
FIGS. 1 and 2 are sectional views of an embodiment of the present invention.
Figure 2:
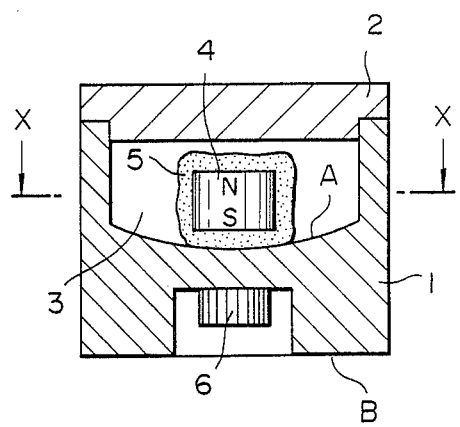

FIGS. 1 and 2 show an embodiment of the present invention. FIG. 1 is a sectional view taken along the line X—X of FIG. 2. Referring to FIGS. 1 and 2, reference numeral 1 denotes a nonmagnetic case made of a material such as aluminum; and 2, a cover made of the same material as that of the case, having a space 3 therein. A bottom surface A defining the space 3 is a smooth arcuated surface. Reference numeral 4 denotes a substantially disk-like (or columnar) permanent magnet. A magnetic fluid 5 is coated on the entire surface of the permanent magnet 4. The magnetic fluid is prepared by mixing spherical magnetic metal powder (e.g., an iron powder) particles having a diameter of 70 Å to 120 Å with an oil such as paraffin oil having a comparatively low viscosity at a volume ratio of 50 : 50. The magnetic fluid has fluidity. Reference numeral 6 denotes a magnetic sensing element mounted so as to oppose the bottom of the space through the case. In this case, a Hall element is used as the magnetic sensing element 6.

In the embodiment with the above arrangement, when a reference surface of the case 1, e.g., a bottom surface B, is set to be horizontal, the magnet 4 is moved to the lowest position of the bottom surface A, i.e., the central portion thereof, by its weight. As a result, the magnetic sensing element 6 receives the strongest magnetism. When the bottom surface B is tilted from the horizontal plane, the magnet 4 is moved toward a lower position of the bottom surface A by its weight. In this case, since the magnetic fluid 5 serves as a lubricating oil, the magnet 4 can be moved with a very small resistance, and hence it can be easily moved to the lowest position of the bottom surface A. Since the magnet 4 is moved away from the magnetic sensing element 6, magnetism to be detected is weakened by a displacement of the magnet 4.

The position of the magnet 4 relative to the magnetic detection element 6 changes in accordance with a tilt angle of the case 1, and hence the magnetism corresponding to the tilt angle can be detected. Therefore, a tilt of an apparatus incorporating the tilt sensor can be detected and attitude control of the apparatus can be performed using the output of the magnetic sensing element 6.

Note that although a Hall element is used as the magnetic sensing element in the embodiment, any other element can be used as long as it can sense magnetism. A mounting position of the magnetic sensing element is not limited to the position in the embodiment, and the number of elements is not limited to one. For example, a plurality of magnetic sensing elements may be disposed on the side walls of the space, and more specifically, the elements may be respectively disposed on the four wall positions at equal angular intervals, thereby detecting directivity as well as a tilt.

As has been described above, according to the present invention, a tilt can be detected with high precision by a simple arrangement, and its detection signals can be applied to a control system for attitude control or the like.

What is claimed is:

1. A magnetic tilt sensor comprising:
   a nonmagnetic case having a space therein,
   a permanent magnet housed to freely movable in said space,
   a magnetic fluid attracted to said permanent magnet, said magnetic fluid being of an amount sufficient to substantially cover an entire surface of said permanent magnet, and
   a magnetic sensing element fixed to said case in opposing relation to said space,
   wherein said permanent magnet is moved to a lower position of the space by reason of its weight when said case is tilted so that magnetic sensed by said magnetic sensing element changes, thereby detecting that said case is tilted.

2. A magnetic tilt sensor according to claim 1, wherein said magnetic sensing element is a Hall effect element.

3. A magnetic tilt sensor according to claim 1, wherein said magnetic fluid includes spherical magnetic metal powder particles mixed with an oil having a low viscosity.

4. A magnetic tilt sensor according to claim 3, wherein said spherical magnetic metal powder particles have a diameter in the range of 70 angstroms to 120 angstroms, said oil is a paraffin oil and said spherical magnetic metal powder particles are mixed with said paraffin oil in the ratio of 50:50.

* * * * *